Sept. 17, 1935.  C. C. FARMER  2,014,885
ELECTROPNEUMATIC BRAKE
Filed Nov. 13, 1931
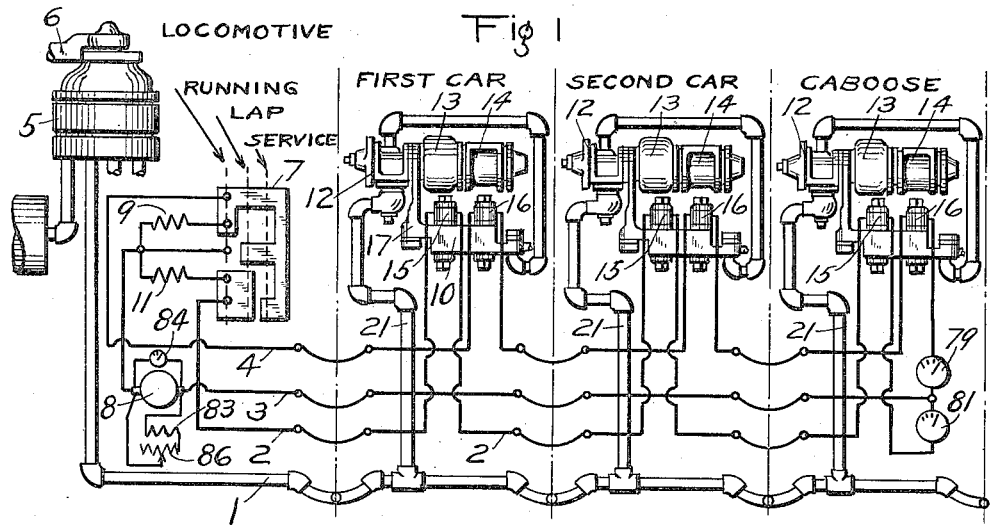
INVENTOR.
CLYDE C. FARMER
BY Wm. H. Cady
ATTORNEY.

Patented Sept. 17, 1935

2,014,885

UNITED STATES PATENT OFFICE 2,014,885

ELECTROPNEUMATIC BRAKE

Clyde C. Farmer, Pittsburgh, Pa., assignor to The Westinghouse Air Brake Company, Wilmerding, Pa., a corporation of Pennsylvania Application November 13, 1931, Serial No. 574,692

4 Claims. (Cl. 303—16)

This invention relates to fluid pressure brakes and more particularly to a fluid pressure brake system in which the application of the brakes is controlled electrically and pneumatically.

With the increase in train lengths, the difficulty of applying the brakes without causing excessive shock, due to the running in of the slack between the cars before the brakes are applied on the rear cars of the train is correspondingly increased.

In my pending application for Letters Patent of January 10, 1931, and serially numbered 507,783, I disclose pneumatically and electrically operated valves that are responsive respectively to reduction in brake pipe pressure and to an electrical control for effecting an application of the brakes, the electrically operated valves being adapted to substantially simultaneously effect the application of all of the brakes on the train, thereby insuring such operation of the brakes as to preclude running in of the slack at the rear of the train.

An object of the invention is to provide an electrical control system for a pneumatic brake system wherein the electrical control devices on the cars of the train are continually energized during running operation at a current value insufficient to cause operation and wherein the electrical operation of the brakes is effected upon an increased energization of the circuit, and wherein current responsive means are provided in the circuit for indicating to an operator the condition of the circuit and the value of the current supplied thereto, thus warning the operator immediately upon a failure of the electrical control system.

A further object of my invention is to provide an electro-pneumatic train brake system wherein the electro-magnets for operating the control valves on the cars of the train are connected in series in their respective control circuits, thereby obtaining an economy in current consumption and simultaneous action of the control devices and enabling the use of inexpensive low resistance electro-magnet valve operating devices, and wherein current responsive signal devices are connected in series with the electro-magnets of the valve operating devices of each control circuit for indicating the current condition in their respective circuits, a failure of the circuit, an electro-magnet winding or the current supply.

In my co-pending application filed coincident herewith and serially numbered 574,691, I have disclosed a pneumatically and electrically controlled fluid brake system wherein the electrically controlled devices are connected in parallel to the feed circuit, and while means are provided for indicating a failure of the feed conductor for supplying the electrically controlled devices, there is no means provided for indicating the failure of one or more of the electro-magnets of the controlling devices. Under certain conditions, the electro-magnet windings may become burned or rendered inoperative because of a break in the winding, and consequently the brakes controlled thereby would not function in response to an electrical impulse initiated for making an application of the brakes of the train.

By connecting the electro-magnet of the control devices in series relation and in series with a current responsive indicating device, a failure of an electro-magnet winding immediately effects the indicating devices and gives warning of the failure.

These and other objects of the invention that will be made apparent throughout the further description thereof, are attained by the control system for an electro-pneumatic brake system hereinafter described and illustrated in the accompanying drawing, wherein, Fig. 1 is a diagrammatic view of an electro-pneumatic brake system embodying features of my invention, the equipment for a locomotive, two cars and a caboose being shown.

Fig. 2 is a diagrammatic view, partly in section, of a triple valve device having electro-pneumatic control elements associated therewith for controlling the application and release of the brakes.

Referring to the drawing, the electro-pneumatic brake equipment may comprise the usual brake pipe 1 and train wires 2, 3 and 4, which wires will hereinafter be respectively referred to as application wire, return wire and release wire.

The locomotive equipment comprises the usual brake valve device having an operating handle 6 for controlling the train brakes pneumatically, and may also comprise a brake switch device 7 which is operative manually for electrically controlling the brakes, a generator 8 for generating direct current, and resistor elements 9 and 11 adapted to be selectively connected in the circuit including the application and release wires 2 and 4 respectively, by the brake switch device 7, which may have three positions, namely, running position, wherein the resistor elements 9 and 11 are connected to the circuits including the application and release wires 2 and 4 respectively; lap position wherein the resistor 9 is shunted from the circuit including the release wire 4 and service position wherein the resistor elements 9 and 11 are shunted from the circuit including the release and application wires 4 and 2, respectively.

Each of the car equipments, including the caboose, may include a triple valve device 12, an electro-magnet valve device 10, an auxiliary reservoir 13, a brake cylinder 14, an application magnet valve device 15 and a release magnet valve device 16, both of which are carried by a bracket 17 that is clamped between the triple valve device and the auxiliary reservoir.

The functions of the triple valve device and the electromagnet valve device are to control the operation of the brakes on the car to which they are applied, the triple valve device being responsive to a reduction in brake pipe pressure occasioned by the operation of the brake valve device 5, and the electro-magnet valve device being responsive to an increase in current value in the circuits including the application and release valve devices 15 and 16 respectively as a result of shunting the resistor elements 9 and 11 out of their respective circuits.

The triple valve device 12 may be of the usual type, comprising a casing having a piston chamber 19 connected to the brake pipe 1, through a passage and pipe 21, and containing a piston 22 adapted to operate a main slide valve 23 and a graduating slide valve 24 contained in a valve chamber 25 connected to the auxiliary reservoir 13.

The application magnet valve device 15 of the electro-magnet valve device 10 may comprise an electro-magnet 26 adapted to control the oppositely seating or double-beat valves 27 and 28 contained in chambers 29 and 31 respectively, chamber 29 being connected to the auxiliary reservoir 13 through a passage 32, and the chamber 31 being open to the atmosphere through a passage 33. A spring 34 within the chamber 31 tends to seat the valve 28 and unseat the valve 27. A chamber 35 is disposed between the seats of the valves 27 and 28 and which communicates with a chamber 36 in an application valve device 31, through a passage 38.

The release magnet valve device 16 may comprise an electro-magnet 39 adapted to control the oppositely seating or double-beat valves 41 and 42 contained in chambers 43 and 44 respectively, chamber 43 being open to the atmosphere through a passage 45 and the chamber 44 being connected to the valve chamber 29 of the magnet valve device 15 through a passage 46. A spring 47 in the chamber 44 tends to seat valve 42 and to unseat valve 41. A chamber 48 is disposed between the seats of the valves 41 and 42 and which communicates with a chamber 49 of a release valve device 51 through a passage 52.

The electro-magnets 26 of the application magnet valve devices 15 on the cars and caboose of the train are connected in series relation in the application wire 2, the return circuit being through the return wire 3. The electro-magnets 39 of the release magnet valve devices 16 of the cars and caboose of the train are connected in series in the release wire 4, the return circuit being through the return wire 3.

The application magnet valve device 37 may comprise a flexible diaphragm valve 56 which is mounted in the bracket 17 and is adapted to seat on an annular seat rib 57, and separates the chambers 36 on one side thereof from an annular chamber 58 on the other side open to the passage 32 leading to the auxiliary reservoir. Leading from the inner seated area of the diaphragm valve is a brake cylinder passage 59.

The release valve device 51 may comprise a flexible diaphragm valve 69 which is mounted in the bracket 17 and is adapted to seat on an annular seat rib 71, and separates the chamber 49 on one side thereof from an annular chamber 72 on the other side open to the atmosphere through a passage and pipe 73. Leading from the seat of triple valve slide valve 23 is exhaust passage 75, which is connected to a pipe 76 leading to the inner seated area of the diaphragm valve 69.

Referring now to the operation of the triple valve device 12 on each of the cars and the caboose, fluid under pressure supplied to the brake pipe 1 flows therefrom to the piston chamber 19 of the triple valve device 12 of each car and caboose equipment through pipe and passage 21, and with the triple valve parts in release position, as shown in Fig. 2, fluid under pressure flows from the piston chamber 19 to the auxiliary reservoir 13 through the usual feed groove 77 around the triple valve piston 22 and valve chamber 25.

Fluid under pressure supplied to the valve chamber 25 in the triple valve device and the auxiliary reservoir 13 flows to the diaphragm chamber 36 in the application valve device 37 through passage 32, valve chamber 29 in the magnet valve device 15, past the unseated valve 27, through chamber 35 and passage 38. From the chamber 29 fluid under pressure flows to the valve chamber 44 in the magnet valve device 16 through the passage 46. Fluid under pressure also flows from the passage 32 to the annular chamber 58.

It will here be noted that with the release magnet valve device 16 in the release position, wherein the magnet valve is deenergized, and wherein the spring 47 retains the valve 41 unseated and the valve 42 seated, the valve chamber 49 in the release valve device 51 is connected to the atmosphere through passage 52, chamber 48 in the magnet valve device 16, past the unseated valve 41, through valve chamber 43 and passage 45, so that the release diaphragm valve 69 will not obstruct communication from the pipe and passage 76 to the atmosphere.

With the triple valve device in release position, the passage 59 which leads from the inner seated area of the flexible diaphragm valve 56 and from the brake cylinder 14 is, when the magnet valve 16 is deenergized, connected to the atmosphere through a cavity 78 in the main slide valve 23 of the triple valve device, passage 75, pipe 76, chamber 72, past the seat rib 71 and the flexed diaphragm valve 69 through passage and pipe 73.

Since the inner seated area of the diaphragm valve 56 is connected to the atmosphere, as just described, the pressure of fluid in the chamber 36 will maintain the diaphragm valve 56 seated on the seat rib 57 against the opposing pressure of fluid in the chamber 58, so that there will be no loss of fluid past this valve from the auxiliary reservoir to the atmosphere.

When it is desired to effect a service application of the brakes through the electrical control equipment, the brake switch is moved to the service position, wherein both resistors 9 and 11 are shunted from their respective control circuits through application and release wires 2 and 4 respectively, and both magnet valve devices 15 and 16 are energized. When the magnet valve device 16 is so energized, it causes the valve 41 to be seated and the valve 42 to be unseated. With the valve 42 unseated, fluid under pressure from the valve chamber 44, as supplied from the auxiliary reservoir, flows to the chamber 49 in the release valve device past the unseated valve 42, through chamber 48 and passage 52, causing the diaphragm valve 69 to flex downwardly into seating engagement with the annular seat rib 71, thus closing communication from the brake cylinder 14 to the atmosphere.

Energization of the application magnet valve device 15, causes the valve 27 to be seated and the valve 28 to be unseated. Seating of valve 27 closes communication from the auxiliary reservoir to the chamber 36 in the application valve device 37. With the valve 28 unseated fluid under pressure is vented from the chamber 36 to the atmosphere through passage 38, chamber 35, past the unseated valve 28, through valve chamber 31, and passage 33.

With the chamber 36 thus vented, the pressure of fluid in the annular chamber 58, as supplied from the auxiliary reservoir, and acting on the underside of the diaphragm valve 56, causes said valve to flex upwardly from the seat rib 57, so that fluid under pressure now flows from the auxiliary reservoir 13 to the brake cylinder 14 through passage 32, valve chamber 58, and passage 59.

Since the release diaphragm valve 69 is seated so that fluid under pressure supplied to the brake cylinder passage 59 cannot escape to the atmosphere, an application of the brakes is effected.

If it should be desired to limit the brake cylinder pressure in effecting an application of the brakes, the operator first moves the brake switch device 7 to service position, and causes the car and caboose brake system to operate to supply fluid under pressure to the brake cylinders in the same manner as specified and then when the desired brake cylinder pressure is obtained, manipulates the brake switch device to lap position, thus cutting in the resistor 11 in the circuit through the application wire 2 and thereby reducing the current through each of the magnet valve devices 15, while maintaining the maximum supply of current through each of the magnet valve devices 16.

Upon reducing the current in the circuit through the magnet valve devices 15, to the normal running value, the pressure of the spring 34 causes the valve 28 to be seated and the valve 27 to be unseated. With the valve 28 seated, communication from the chamber 36 in the application valve device 37, to the atmosphere is closed and with the valve 27 unseated, fluid under pressure from the passage 32 again flows to the chamber 36 and causes the diaphragm valve 56 to flex downwardly into seating engagement with the seat rib 57, thus cutting off the further flow of fluid from the auxiliary reservoir to the brake cylinder.

To effect the electric release of the brakes, the operator moves the brake switch device to running position, thereby interposing the resistor elements 9 and 11 in the release and application wires 4 and 2 respectively, and thereby deenergizing the magnet valve devices 15 and 16 sufficiently to permit the springs thereof to return them to the running position. With the application magnet valve device in running position, the application diaphragm valve 56 is caused to seat and close off the flow of fluid from the auxiliary reservoir to the brake cylinder passage 59 as before described.

With the release magnet valve device 16 in running position, communication between the auxiliary reservoir and the chamber 49 is closed, and fluid under pressure may be exhausted from the chamber 49 to the atmosphere through passage 52, chamber 48, past the unseated valve 41, to chamber 43 and vent 45. With the pressure in chamber 49 thus removed from the upper side of the diaphragm valve 69, the valve will be flexed upwardly by the pressure of fluid in the passage 76 acting on the inner seated area of the release diaphragm valve 69.

With the valve 69 thus unseated, fluid under pressure flows from the brake cylinder to the atmosphere through passage 59, cavity 78 in the main slide valve 23 of the triple valve device 12, passage 75 and pipe 76, valve chamber 72 in the release valve device 51, and passage and pipe 73.

With the brakes completely released, the diaphragm valve 69 may, due to resiliency, remain in its unseated position until such time as an application of the brakes is initiated by means of the electric equipment.

It will here be understood that the application and release of the brakes are to be normally controlled through the medium of the electric equipment and that the triple valve device, when the electric equipment is used, does not move from its release position. However, in the event of a failure of the electric equipment, the operator by the use of the brake valve device may so vary the brake pipe pressure as to cause the triple valve device to operate to effect the application and release of the brakes in the usual well known manner.

In order to apprise the trainmen of any failure in the electrical control system, suitable current-responsive meters or audible signal devices 79 and 81 are provided, the former being connected in series with the release magnet valves 16 in the release wire 4 and the latter being connected in series with the application magnet valve devices 15 in the application wire 2, as indicated in the diagram Fig. 1.

The meter or signal devices which may give either a visible or audible signal or both, are intended to indicate the condition of the control circuit for the magnet valve devices on the cars and caboose and are placed on the caboose where they are accessible to the trainmen. The signal device 81 is connected in the circuit which includes the application wire 2 and will indicate a short circuit condition across application and return wires 2 and 3 respectively, or a break in either of the wires or the electro-magnet coil, or failure of the current supply. The signal device 79 is connected in the circuit which includes the release conductor 4 and will indicate a short circuit across the return wire 3 and release wire 4, or a break in either wire or electro-magnet coil, or failure of the current supply. It is apparent, therefore, that any failure in the electrical control system that will render it ineffective to control the brake equipment will be indicated in the meter or other signal devices 79 and 81 on the caboose.

By reason of the electro-magnet devices 15 and 16 being connected in their respective circuits in series relation, all the electromagnet coils thereof will be energized simultaneously and thereby secure a simultaneous action of the electro-magnet valve devices in making an application of the brakes throughout the entire length of the train. This is not the case where the electromagnet valve devices are connected in parallel relation to the feed conductors of the system, because the voltage applied to the electro-magnet valve devices of the cars at the rear of the train is considerably less than the voltage applied to the electro-magnet valve devices of the cars at the front end of the train. Due to the inductive action of the coils and the lower voltage applied to certain of the coils, there is a slight delay in the operation of the electromagnet valve devices at the rear end of the train.

Because the electro-magnets 26 and 39 are connected in series relation in the application and release wires 2 and 4 respectively, the resistance of the circuit containing them will vary with the number of cars in the train. In order to properly effect the operation of the magnet valve devices 15 and 16 in the system, regardless of the length of the train, it is desirable to provide an adjustable resistor 86 in the circuit of the field winding 83 of the generator 8, for so varying the total voltage in the system as to maintain the necessary operating voltage drops across the electromagnets. A volt meter 84 is also provided on the locomotive for indicating the voltage supplied by the generator 8.

In an electro-pneumatic brake system having electro-magnet valve devices connected in parallel, sufficient voltage must be applied to the supply circuit to energize the electro-magnet valve devices at the rear end of the train. Consequently more voltage is applied to the electro-magnets at the head end of the train than is necessary to cause their operation. Current is thus wasted in the electro-magnet valve devices at the front end of the train.

By connecting the electro-magnet valve devices in series relation in the circuit and by regulating the voltage at the generator, only sufficient voltage is applied to the circuit for energizing the electro-magnet valves to effect operation thereof.

Summarizing, the brakes on the cars of the train, including the caboose, can either be controlled pneumatically by the usual triple valve device on each car and caboose, adapted to respond to a reduction in brake pipe pressure initiated by operation of the usual engineman's brake valve, or electro-pneumatically by varying the current supplied to electrically controlled devices on each car and the caboose by manipulation of a brake switch device on the locomotive.

The triple valve devices are responsive to brake pipe pressure and function in the usual manner to control the supply of fluid under pressure to the brake cylinder from the auxiliary reservoir, and to control the exhaust of fluid under pressure from the brake cylinders to the atmosphere.

The electro-magnet valve devices are provided with valve means controlled by application and release magnet valve devices that function independently of operation of the triple valve device for accomplishing the same function as the triple valve device.

The electro-magnets of the magnet valve devices are continuously energized when the source of supply is connected to the feed conductors extending throughout the length of the train, but the magnet valves remain in normal release position until the current through the electromagnets is materially increased by shunting resistor elements out of the control circuit by movement of the engineman's brake-switch device to a service position.

Both of the magnet valves associated with each triple valve device are then moved to application or service position, wherein a valve controlling the normally open exhaust port from the brake cylinder is closed, and wherein a normally closed valve controlling the delivery of fluid under pressure from the auxiliary reservoir is opened for effecting an application of the brakes.

To regulate the fluid pressure in the brake cylinder upon a service application of the brakes, the engineman permits the necessary pressure to be attained and then moves the brake switch device to lap position wherein the application magnet valve device is partially deenergized by the interposing in its control circuit of a resistor element. This causes the application magnet valve to return to its normal release position under the influence of a spring and results in the closure of the application valve to cut off further delivery of fluid under pressure from the auxiliary reservoir to the brake cylinder.

Movement of the engineman's brake switch device to the running position causes partial deenergization of both of the magnet valve devices, and their return to normal running positions, wherein the brake cylinder is open to the atmosphere and the auxiliary reservoir is closed.

Current responsive indicating devices, such as meters or audible signal devices, are disposed on the caboose in series relation in the control circuits to indicate to the trainmen in the caboose the condition of the control circuits. It will be understood that the meters or audible signal devices on the caboose remain energized so long as the control circuit is intact and connected to a source of supply current and while the engineman's brake valve device is in any of its operative positions hereinbefore indicated.

By reason of the series related electro-magnet valve devices and the meters or audible signal devices being connected in series relation, an indication is given in the caboose when an electro-magnet valve device coil is broken or when a feed conductor associated therewith is interrupted. The series relation of the coils enables a simultaneous application of the brakes and also results in an economy of current required for operating the system.

While I have disclosed but one embodiment of the invention, it is obvious that various changes, additions and omissions may be made in the pneumatically and electrically controlled fluid pressure brakes herein described without departing from the spirit of my invention.

Having now described my invention, what I claim as new and desire to secure by Letters Patent, is:

1. In an electro-pneumatic brake, the combination with a pair of brake controlling electromagnetic devices on each of a plurality of cars, of a normally closed circuit having in series relation therein two parallel branches containing, respectively, in series relation therein corresponding said electro-magnetic devices on successive cars, and means for normally effecting a flow of current in said circuit to which said electro-magnetic devices are operatively unresponsive and adapted to selectively increase the current in said parallel branches so that said electromagnetic devices operatively respond thereto.

2. In an electro-pneumatic brake, the combination with a pair of brake controlling electromagnetic devices on each of a plurality of cars, of a normally closed circuit having in series relation therein two parallel branches containing, respectively, in series relation therein corresponding said electro-magnetic devices on successive cars, means for normally effecting a flow of current in said circuit to which said electro-magnetic devices are operatively unresponsive and adapted to selectively increase the current in said parallel branches so that said electro-magnetic devices operatively respond thereto, and current responsive means on at least one of the cars connected in series relation in each of said parallel branches for continuously indicating the integrity of said circuit and said electro-magnetic devices.

3. In an electro-pneumatic brake, the combination with a pair of electro-magnetic devices on each of a plurality of cars, each pair being operative to control the brakes on its corresponding car, of a normally closed circuit having in series relation therein two parallel branches containing, respectively, in series relation, corresponding said electro-magnetic devices on successive cars, current limiting means in each of the said parallel branches for normally limiting the current through said branches to a value such that said electro-magnetic devices are operatively unresponsive thereto, and means for selectively rendering said current limiting means ineffective to limit the current in said parallel branches and thereby causing the current in said circuit to increase to a value such that said electro-magnetic devices operatively respond thereto.

4. In an electro-pneumatic brake, the combination with a pair of electro-magnetic devices on each of a plurality of cars, each pair being operative to control the brakes on its corresponding car, of a normally closed circuit having in series relation therein two parallel branches containing, respectively, in series relation, corresponding said electro-magnetic devices on successive cars, current limiting means in each of the said parallel branches for normally limiting the current through said branches to a value such that said electro-magnetic devices are operatively unresponsive thereto, means for selectively rendering said current limiting means ineffective to limit the current in said parallel branches and thereby causing the current in said circuit to increase to a value such that said electro-magnetic devices operatively respond thereto, and current responsive means on at least one of the cars connected in series relation in each of the said parallel branches for continuously indicating the integrity of said circuit and said electro-magnetic devices.

CLYDE C. FARMER.